US010831914B2

(12) United States Patent
Newsom, III

(10) Patent No.: US 10,831,914 B2
(45) Date of Patent: Nov. 10, 2020

(54) SECURE EXTENSIBLE WIRELESS COMMUNICATION WITH IOT DEVICES

(71) Applicant: Bank of America Corporation, Charlotte, NC (US)

(72) Inventor: Jesse Strickland Newsom, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 295 days.

(21) Appl. No.: 15/935,160

(22) Filed: Mar. 26, 2018

(65) Prior Publication Data
US 2019/0294809 A1 Sep. 26, 2019

(51) Int. Cl.
| | |
|---|---|
| *H04W 4/70* | (2018.01) |
| *H04W 12/10* | (2009.01) |
| *H04W 12/12* | (2009.01) |
| *G06F 21/62* | (2013.01) |
| *H04L 29/06* | (2006.01) |
| *H04L 29/08* | (2006.01) |

(52) U.S. Cl.
CPC ...... *G06F 21/6218* (2013.01); *H04L 63/1416* (2013.01); *H04L 67/12* (2013.01); *H04W 4/70* (2018.02); *H04W 12/10* (2013.01); *H04W 12/12* (2013.01)

(58) Field of Classification Search
CPC ..... G06F 21/6218; H04W 4/70; H04W 12/10; H04W 12/12; H04L 63/1416; H04L 67/12
See application file for complete search history.

(56) References Cited

U.S. PATENT DOCUMENTS

| | | | |
|---|---|---|---|
| 9,319,404 B2 | 4/2016 | Svigals | |
| 9,485,231 B1 | 11/2016 | Reese | |
| 9,565,192 B2 | 2/2017 | Chillappa et al. | |
| 9,591,016 B1 | 3/2017 | Palmieri et al. | |
| 9,699,659 B2 | 7/2017 | Zehavi et al. | |
| 9,699,814 B2 | 7/2017 | Zakaria et al. | |

(Continued)

OTHER PUBLICATIONS

Conoscenti et al., "Peer to Peer for Privacy and Decentralized in the Internet of Things," 2017, IEEE, pp. 288-290. (Year: 2017).

(Continued)

*Primary Examiner* — Lynn D Feild
*Assistant Examiner* — Vladimir I Gavrilenko
(74) *Attorney, Agent, or Firm* — Weiss & Arons LLP; Michael A. Springs, Esq.

(57) ABSTRACT

Systems and methods for establishing a protected, multi-hop, extensible channel of wireless communication using IoT devices are disclosed. A plurality of IoT devices may relay, via hardware and/or software embedded in each device, wireless messages from one device to another. The IoT devices may form a chain, each IoT device within wireless communication range of at least one other IoT device. The chain may be extended by adding IoT devices to the chain. A message may hop from one IoT device in the chain to the next, and may ultimately be transmitted across the full span of the chain. Hardware and/or software in each IoT device may emit an electromagnetic masking signal at each hop. The masking signal may introduce electromagnetic noise into the environment and protect the message from interception.

20 Claims, 7 Drawing Sheets

(56) References Cited

U.S. PATENT DOCUMENTS

| | | |
|---|---|---|
| 9,716,595 B1 | 7/2017 | Kravitz et al. |
| 9,729,528 B2 | 8/2017 | Zakaria et al. |
| 9,825,921 B2 | 11/2017 | Reese |
| 9,875,510 B1 | 1/2018 | Kasper |
| 10,251,053 B1 | 4/2019 | Paczkowski |
| 2014/0364053 A1* | 12/2014 | Schirrmacher .......... H04K 3/65 455/1 |
| 2016/0173495 A1 | 6/2016 | Joo |
| 2016/0219024 A1* | 7/2016 | Verzun ................. H04L 9/0662 |
| 2016/0248746 A1 | 8/2016 | James et al. |
| 2016/0259937 A1 | 9/2016 | Ford et al. |
| 2016/0260095 A1 | 9/2016 | Ford |
| 2016/0337127 A1 | 11/2016 | Schultz et al. |
| 2016/0366181 A1 | 12/2016 | Smith et al. |
| 2017/0094621 A1* | 3/2017 | Xu ....................... H04L 47/125 |
| 2017/0163444 A1 | 6/2017 | McLaughlin et al. |
| 2017/0289184 A1 | 10/2017 | C et al. |
| 2017/0310706 A1* | 10/2017 | Wu ..................... H04L 63/1491 |
| 2018/0253451 A1 | 9/2018 | Callan et al. |
| 2019/0103154 A1* | 4/2019 | Cox ..................... G11C 7/1072 |
| 2019/0115974 A1* | 4/2019 | Frolov ............... H04B 7/18504 |
| 2019/0124586 A1* | 4/2019 | Sahin .................. H04B 17/382 |
| 2019/0172566 A1 | 6/2019 | Schulman et al. |
| 2019/0289454 A1 | 9/2019 | Inoue |
| 2019/0306024 A1* | 10/2019 | Petria ...................... H04L 67/34 |
| 2019/0349190 A1 | 11/2019 | Smith et al. |
| 2019/0349426 A1* | 11/2019 | Smith .................. H04L 67/104 |

OTHER PUBLICATIONS

"Securing the Internet of Things: A Proposed Framework," https://www.cisco.com/c/en/us/about/security-center/secure-iot-proposed-framework.html, Mar. 16, 2016.

"Global Hacker Botnet tops 6 million hijacked devices," http://www.computerweekly.com/news/450427023/Global-hacker-botnet-tops-6-million-hijacked-devices, Sep. 27, 2017.

* cited by examiner

SECURE EXTENSIBLE WIRELESS COMMUNICATION WITH IOT DEVICES

FIELD OF TECHNOLOGY

This application relates to Internet-of-Things (IoT) devices. Specifically, it relates to secure wireless communication with IoT devices.

BACKGROUND OF THE DISCLOSURE

Billions of devices worldwide are connected to the internet. These devices form the bulk of the Internet-of-Things (IoT). The complexity of these devices may range from very simple to highly sophisticated. IoT devices may communicate with each other many times each day.

Many IoT devices function within sensitive networks. A sensitive network may contain sensitive data that is important to keep within the network. Sensitive data, if obtained by entities outside the network, may enable monetary loss and/or bodily harm. Examples of sensitive data may include financial or business information. Government, security, and military information may be other examples. Many IoT devices may transmit sensitive data.

Additionally, the world today relies heavily on seamless wireless communication. Businesses, health and financial institutions, and governments would fail without real-time updates and information.

On a micro level as well, people typically rely extensively on being connected to the grid. The grid may include the internet. The grid may also include telephone service. People typically depend on this connection for work, entertainment, and safety. When wireless connection is unavailable, the results may be harmful. For example, banks, hospitals and businesses may lack, and be unable to obtain, vital information. A large-scale disaster may strand survivors in the disaster zone, unable to reach out for assistance. An agent may be deployed in the field, unable to contact his or her base.

A typical wireless network architecture may lack IoT devices. The typical network may rely on infrastructure such as the cellular telephone network. Furthermore, the typical wireless communication network may be vulnerable to interception. That vulnerability may render the typical networks unusable for many applications that contain sensitive data.

Due to the ubiquity of IoT devices, it would be desirable to enable a system to communicate wirelessly using its own constituent IoT devices. This communication may be attainable even if the traditional wireless network is damaged, unavailable or untrusted. It would be further desirable for the IoT communication system to be protected from interception.

SUMMARY OF THE INVENTION

An extensible, multi-hop, IoT device-assisted, protected wireless communication system is provided. The system enables a secure channel of wireless communication to a field IoT device. A field IoT device may be an IoT device that is part of the system. The system may contain a plurality of constituent IoT devices. Each of the plurality of IoT devices may be able to communicate wirelessly with other IoT devices.

At least one of the plurality of IoT devices may be a base node. At least another of the plurality of IoT devices may be a field IoT device. The field IoT device may have a sensitive message to communicate with the base node. A message may be considered sensitive if determined by the system as worthy of being shielded from outside interception.

Each of the plurality of IoT devices may contain a hardware and/or software based secure-hop (SH) component. The SH component may be capable of receiving messages from other constituent IoT devices. The SH component may be further capable of broadcasting, self-originated messages and/or received messages, to other constituent IoT devices within wireless communication range. Each broadcast between constituent IoT devices may involve a sending device that is sending a message, and at least one receiving device that is receiving the message. Each broadcast may be a communication hop.

The SH component may be further capable of emitting a masking signal substantially simultaneous to each communication hop. The masking signal may contain electromagnetic waves of a particular pattern. The pattern may feature constant or varying frequency, wavelength, and amplitude. The pattern may be random in nature. The pattern may be of a similar frequency to that of the communication hop. The pattern may introduce electromagnetic noise into the environment of the communication hop. This noise may effectively render the message being transmitted across a communication hop as unintelligible to an entity outside the system. The outside entity may be attempting to illicitly obtain data by intercepting, without proper consent, a message being transmitted across a communication hop. The masking signal may render the content of the message secure even though the existence of the communication may be discernable. The masking signal may be a form of communications security (COMSEC).

Using the SH component, the receiving device in a communication hop may have knowledge of the particular pattern of a masking signal. This knowledge may enable the receiving device to filter the masking signal out of the noisy environment. When so filtered, the receiving device may be able to retrieve the intended message transmitted across the communication hop.

The system may contain a plurality of constituent IoT devices in addition to the base node and field IoT device. The additional IoT devices may be arrayed in a chain-like fashion. The chain may be configured such that each constituent IoT device is within wireless communication range of at least one other constituent IoT device. The chain of devices may extend between the base node and the field IoT device. The system may be extensible to couple as many IoT devices as necessary to extend the chain to a field IoT device that is relatively far away from the base node.

The field IoT device may use the SH component to transmit a sensitive message to the base node. The transmission may be accomplished in a manner that is protected from being intercepted. The sensitive message may hop from one constituent IoT device in the chain to the next, until it reaches the base node. Each hop may be protected with the emission of a masking signal.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
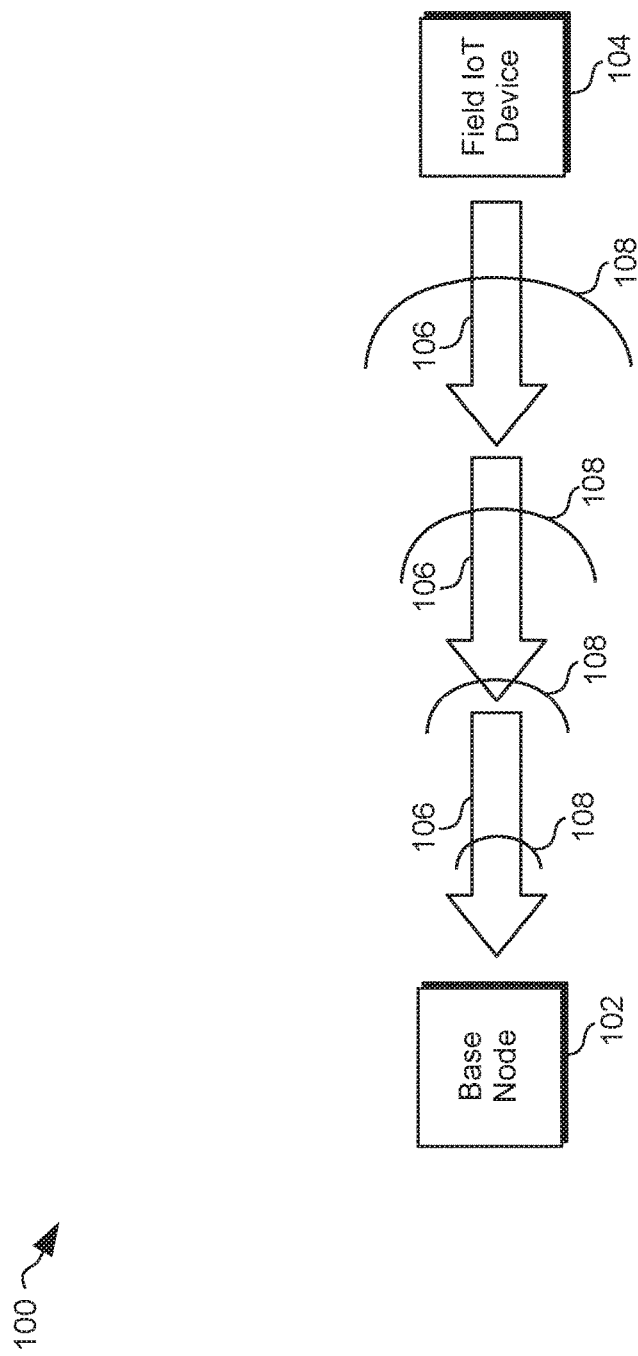
FIG. 1 shows an illustrative system in accordance with principles of the disclosure.

Methods and apparatus for providing an extensible, multi-hop, IoT device-assisted, protected wireless communication system are provided. The system may contain a plurality of constituent IoT devices. Each of the plurality of IoT devices may be able to communicate wirelessly with other IoT devices. The system may enable a secure channel of wireless communication between its constituent devices.

At least one of the plurality of IoT devices may be a base node. The base node may contain hardware and/or software that may provide administrative functionality. The base node may be securely coupled to an administrative center. The administrative center may include an interface with one or more human operators.

At least another of the plurality of IoT devices may be a field IoT device. The field IoT device may have a sensitive message to communicate with the base node. A message may be considered sensitive if determined by the system as worthy of being shielded from outside interception. The system may enable a secure channel of wireless communication between a field IoT device and the base node. The system may also enable a secure channel of wireless communication between field IoT devices.

A field IoT device may be a device in the service of an agent, human or otherwise, deployed in the field. The field may be a geographical area within which the agent is operating. For example, the agent may be an employee of a financial institution. The employee may be a human or a robot. The agent may be carrying a field IoT device. The field IoT device may be a tablet computer. The field IoT device may include applications to interface with customers. The field IoT device may be designed to transmit sensitive customer information to an administrative base in the institution. Additionally, the field IoT devices may be designed to transmit sensitive information between one another. In another example, agents may be military or security personnel deployed in a field of operations.

Each of the plurality of IoT devices may contain a hardware and/or software based secure-hop (SH) component. The hardware may include a processing chip. The hardware may also include an antenna. The SH component may be capable of receiving messages from other constituent IoT devices. The SH component may be further capable of broadcasting, self-originated messages and/or received messages, to other constituent IoT devices within wireless communication range. Each broadcast between constituent IoT devices may involve a sending device that is sending a message, and at least one receiving device that is receiving the message. Each broadcast may be a communication hop.

The SH component may be further capable of emitting a masking signal substantially simultaneous to each communication hop. The masking signal may contain electromagnetic waves of a particular pattern. The pattern may feature constant or varying frequency, wavelength, and amplitude. The pattern may introduce electromagnetic noise into the environment of the communication hop. The environment may include the spatial range and temporal span of the communication hop to be masked. The masking signal may thus provide noise over the entire space and time of the communication hop. This noise may effectively render the message being transmitted across a communication hop as unintelligible to an entity outside the system. The outside entity may be attempting to illicitly obtain data by intercepting, without proper consent, messages being transmitted across communication hops.

The masking signaled may be designed to reduce the risk of the outside entity learning the contents of the message being transmitted across the communication hop. The masking signal may be similar to the message in its electromagnetic wave attributes so as to blend the two signals together as one aggregate signal. In the aggregate signal, neither one component signal may be recognizable over the other. The aggregate signal may not represent any intelligible information. Furthermore, even if the masking signal and the message originate from different devices in a masked communication hop, the outside entity may perceive the aggregate signal as originating in one location. This perception may be due to the relatively short range inherent to a communication between IoT devices. The masking signal may thereby secure the content of the masked message. The content of the message may be secure even though the existence of the communication may be discernable. The masking signal may be a form of communications security (COMSEC).

The SH component may further include the capability, in a receiving device in a communication hop, to recognize and decipher the particular pattern of a masking signal. With this capability, the receiving device may be able to filter the masking signal out of the noisy environment. When the noise is filtered out, the receiving device may be able to retrieve the intended message transmitted across the communication hop.

The system may contain a plurality of constituent IoT devices in addition to the base node and field IoT device. The additional IoT devices may be arrayed in a chain-like fashion. The chain may be configured such that each constituent IoT device is within wireless communication range of at least one other constituent IoT device. The chain of devices may extend between the base node and the field IoT device. The system may be extensible to couple as many IoT devices as necessary to extend the chain to a field IoT device that is relatively far away from the base node.

The field IoT device may use the SH component to transmit a sensitive message to the base node. The transmission may be accomplished in a manner that is protected from being intercepted. The sensitive message may hop from one constituent IoT device in the chain to the next, until it reaches the base node. Each hop may be protected with the emission of a masking signal.

A challenge faced by the system is that of the receiving device obtaining the capability to recognize the pattern of the masking signal. This capability is crucial, as the receiving device uses the recognition to filter the noise of the masking signal. Once filtered, the receiving device may retrieve the masked message. Another challenge is that of synchronizing the masking signal and the communication hop. The embodiments that follow address these, among other, challenges.

In one embodiment of the system, the receiving device may emit the masking signal. This embodiment enables the receiving device to recognize the pattern of the masking signal. A challenge that presents in this embodiment, however, is that of how the receiving device knows when to emit the masking signal. This embodiment, therefore, may further contain an alert signal. The sending device may broadcast an alert signal immediately before initiating a communication hop to be masked. The alert signal may direct the receiving device to immediately emit a masking signal. Thus, the masking signal and the communication hop are synchronized.

In this embodiment, i.e. where the receiving device emits the masking signal upon the receipt of an alert signal, there exists a risk of the receiving device not receiving the alert signal. If the receiving device does not receive the alert signal, the sending device may transmit its message, and the message may not be protected by the cover of a masking signal. To mitigate this risk, the system may be configured to include an acknowledgement (ACK) message. The receiving device may send an ACK to the sending device when it receives the alert signal. The sending device may wait for the ACK before sending its message.

Furthermore, in this embodiment it may desired for the receiving device to receive indication of the conclusion of the communication hop. The receiving device may continue to emit the masking signal until it receives such an indication. The indication may be in the form of a predetermined bit or sequence of bits in a communication packet. The indication may be a predetermined, unique, communication packet, that is dedicated to indicate the conclusion of a communication hop. This may prevent the receiving device from terminating the emission of a masking signal prior to the conclusion of a communication hop. A premature termination of a masking signal can leave the message of a communication hop vulnerable to interception.

In another embodiment of the system, the sending device may emit the masking signal. Because the same device is transmitting the message and also emitting the masking signal, this embodiment enables the sending device to synchronize the masking signal and the communication hop. An alert signal is not necessary. Furthermore, since this embodiment does not need an alert signal, the risk of the alert signal not being received is eliminated.

A challenge that presents in this embodiment, i.e. where the sending device emits the masking signal, is that of how the receiving device recognizes the pattern of the masking signal. One configuration to solve this challenge may include a preprogramming of the system devices. The preprogramming may provide a predetermined pattern to be always used by the system. The preprogramming may also provide a predetermined set of patterns. The preprogramming may map the set of patterns to another set of factors. These factors may include times, locations, or other predetermined scenarios. As such, the sending device will follow the preprogrammed mapping in selecting a pattern for the masking signal. Upon receiving a masked message, the receiving device will determine, based upon the preprogrammed mapping to the set of factors, which pattern was to be used. Upon this determination, the receiving device will be able to filter the noise and retrieve the message.

An extensible, multi-hop, IoT device-assisted, emergency wireless communication system is provided. The system may enable wireless communication to an isolated device. The isolated device may be situated in an area wherein wireless communication capability is heretofore lacking.

The system may include a plurality of IoT devices. Each of the plurality of IoT devices may include the ability to communicate wirelessly with other IoT devices.

The system may also include a first geographical area. The first area may contain wireless communication capability everywhere within its boundaries. The first area may include at least one wireless-enabled node that is capable of communicating wirelessly. The node may be coupled to a communication network.

The system may further include a second geographical area. The second area may be contiguous with the first area. The second area may lack functional wireless communication capability anywhere within its boundaries. IoT devices in the second area may be beyond the range of the wireless-enabled node of the first area. As such, they may be unable to send any messages to the communication network.

The plurality of IoT devices in the system may include at least one isolated IoT device. The isolated IoT device may be situated in the second area. Due to its location, it may be unable to send any messages to the communication network.

The plurality of IoT devices in the system may further include at least one device called a first IoT device. The first IoT device may include the ability to communicate wirelessly with the wireless-capable node in said first area. The first IoT device may be situated in the confines of the first area. Within the first area, however, it may be positioned relatively close to the border with the second area. In this position, the first IoT device may be able to communicate wirelessly with both the wireless-capable node in the first area, and at least one other isolated IoT device in the second area.

In the disclosed system, an isolated IoT device may send a wireless message to the communication network via the first IoT device. The message may initially hop from the isolated IoT device to the first IoT device. The message may then hop once again from the first IoT device to the wireless-enabled node that is coupled to the communication network.

The effective range of the disclosed system may be extensible. At least one additional IoT device may be deployed into the second area. The IoT devices may be arrayed in a chain-like fashion. In the chain, each IoT device may be within the wireless communication range of at least one other IoT device. Each additional IoT device may function as a router to further extend, outward from the first area, the range of wireless communication with the wireless-enabled node. Within this chain of devices, each device may relay communication from one to the other, until the isolated IoT device farthest from the first area is reached. At that point, the farthest isolated IoT device may be enabled to communicate with the communication network in the first area via the chain of IoT devices. The farthest isolated IoT device may send a wireless message to the communication network.

The disclosed system may include an emergency-communication component built in to the IoT devices. The component may contain software and/or hardware. The component may include a processor chip. The component may also include a software program that contains preprogrammed steps for the device to follow. The component may control the flow of communication between the IoT devices in the system. The emergency-communication component may be configured in multiple ways, as described in the following paragraphs.

In one embodiment, the emergency-communication component of the disclosed system may be activated exclusively in specific scenarios. The activation may be performed manually by an entity with administrative privileges over the IoT device. The administrator may choose to activate the component when wireless communication in the area surrounding the device has been compromised. Alternatively, the device may be preprogrammed to self-activate the emergency-communication component under certain conditions. The conditions may be met when the device senses that wireless communication in its surrounding area has been compromised.

In another embodiment, the emergency-communication component of the disclosed system may be active by default. The component may be configured to relay all messages received from IoT devices to other IoT devices. Alternatively, the component may be configured to exclusively relay messages with emergency status. A message may attain emergency status based on its content. The content may match a specific form or set of forms predetermined by the system. The system may also predetermine a categorical nature of content that grants a message emergency status. A message may also attain emergency status by the inclusion of a system-recognized flag declaring an emergency. The flag may be a predetermined bit or sequence of bits. An isolated IoT device may broadcast an emergency message. The emergency-communication component enabled IoT devices within wireless range may relay the message to other IoT devices. The message may continue hopping from one device to another, until it reaches the communication network.

In yet another embodiment, the emergency-communication component may only function in the confluence of both of the above described factors, in the following manner. The component might be activated exclusively in specific scenarios, as described above. Even within those specific scenarios, however, the component might only relay messages with emergency status.

Once the emergency-communication component of a device determines that a received message is to be relayed, the component may direct its device to transmit the message. The component may be configured with a plurality of routing protocols. In one embodiment, the emergency-communication component may relay messages to all other IoT devices within its wireless communication range. In another embodiment, the emergency-communication component may relay messages exclusively to other IoT devices that are situated geographically closer to the wireless-enabled node in the first area. In this embodiment, the emergency-communication component may wait for an acknowledgement (ACK) packet from the wireless-enabled node. The component may wait for an ACK because, although it sent the message to a device closer to the wireless-enabled node, that device may not be part of an unbroken chain of devices connecting the node and the isolated device. If the emergency-communication component does not receive an ACK within a predetermined threshold waiting period, the emergency-communication component may direct its device to resend the message. The resending may be directed to devices and directions not included in the initial, unacknowledged, sending.

In one embodiment of the system, the wireless-enabled node in the first area may include a cellular tower. In another embodiment, the wireless-enabled node may include a wireless internet router.

In one embodiment, the wireless message relayed by the system may include text, audio, and/or video media. The message may be restricted to a predetermined emergency message. The system may function to relay a message from the isolated device to the communication network. Additionally, and/or alternatively, the system may function to relay messages from the communication network to an isolated device. The system may also relay messages between IoT devices.

In one embodiment of the system, the mode of wireless communication between IoT devices may include short-distance, low-power protocols. The protocols may include Wi-Fi, Zigbee, Bluetooth, and Bluetooth Low Energy (BLE). The use of these protocols may conserve the energy of the devices in the system. The energy of the devices may be limited due to the nature of simple IoT devices. The energy available to the devices may be further limited by the situation the device is in. The situation may be a disaster zone.

In one embodiment, the system may be configured as a rescue mechanism. The environment of the rescue mechanism may be a disaster zone. At least one of the IoT devices may include a rescue device. An IoT device may be classified as a rescue device if attached to a living rescue worker. The worker may be a person or an animal. A rescue device may also include a remotely or autonomously operated airborne drone or ground robot. The drone or robot may be specially designed and/or programmed to assist in rescue operations. The rescue devices may function solely as communication-extending devices in the system. The rescue devices may also contain other functionality in addition to extending communication in the system.

In the embodiment of the system as a rescue mechanism, at least one isolated IoT device may be a personal IoT device. The personal IoT device may be located in close proximity to a person in distress. The close proximity may enable the person to initiate a transmission from the device. The personal IoT device may be within the physical reach of the person. If the personal IoT device is enabled to respond to voice commands, the personal IoT device may be within audible range of the person.

In the embodiment of the system as a rescue mechanism, a plurality of rescue devices may be deployed throughout a disaster zone. The typical wireless infrastructure of the disaster zone may be in disrepair. The typical infrastructure may include cellular towers. The rescue devices may use the emergency-communication component to communicate amongst each other. The rescue devices may use the emergency-communication component to communicate with a device configured as a central command hub. The rescue devices may also form a chain of devices to establish communication with an isolated IoT device. The isolated IoT device may be a personal IoT device, as described in the preceding paragraph. The establishment of communication with the personal IoT device may convey much needed emergency information to the person in distress. The establishment of communication may allow the person in distress to send messages to the communication network. These messages may convey vital information regarding the needs of the person in distress. These messages may even alert the rescue mechanism to the existence and whereabouts of the person in distress.

A system containing constituent IoT devices, that enables a secure channel of communication between its constituent IoT devices, is provided. The system may include a plurality of IoT devices. Each of the IoT devices may include the ability to communicate wirelessly with other IoT devices within the system in an intra-system communication. An intra-system communication may include a sending device that is transmitting a message and a receiving device which is the target recipient of the message.

In the disclosed system, each IoT device may contain a secure-communication (SC) component. The SC component may include hardware and/or software. The SC component may direct a device in the system to emit a masking signal.

A masking signal may include electromagnetic waves of a particular pattern. The pattern may contain constant or varying frequency, wavelength, and amplitude. The pattern may introduce electromagnetic noise into an environment of the system. The noise may render a substantially simultaneous intra-system communication between constituent IoT devices as unintelligible to an entity outside the system. The outside entity may be attempting to illicitly obtain data by intercepting intra-system communications without proper consent.

The SC component may further include the capability, of the receiving device in an intra-system communication, to recognize and decipher the particular pattern of a masking signal. With this capability, the receiving device may be able to filter the masking signal out of the noisy environment. When the noise is filtered out, the receiving device may be able to retrieve the intended message of the intra-system communication.

In one embodiment of the system, the SC component may be configured to be active at all times. In this embodiment, every intra-system communication may be secured with a masking signal.

In another embodiment of the system, the SC component may be configured to function exclusively when activated. A system administrator may activate the SC component. Alternatively, the SC component may be activated by an alert. A constituent IoT device may alert the system of an imminent intra-system communication that will comprise secure information. Information may be considered secure if determined by the system as requiring to be shielded from outside interception. The alert may include the broadcasting of a predetermined activation signal. The alert may activate the SC component to emit a masking signal to protect the secure intra-system communication.

In one embodiment of the system, the SC component may direct the receiving device to emit the masking signal. This embodiment may further include an alert signal, broadcast by the sending device. The sending device may broadcast the alert signal immediately prior to sending an intra-system communication to be masked. The alert signal may be a message directing the receiving device to emit a masking signal.

In another embodiment of the system, the SC component may direct the sending device to emit the masking signal. In this embodiment, the system devices may be preprogrammed with predetermined patterns or sets of patterns. This preprogramming may give the receiving device the capability to recognize the pattern of the masking device. Alternatively, the sending device may transmit a message to the receiving device indicating the pattern of the masking signal. The message may explicitly state the pattern. The message may alternatively indicate the chosen pattern by referring to a preprogrammed set of patterns. The message might be encrypted. The message may enable the receiving device to recognize the pattern of the masking signal. The recognition of the pattern may enable the receiving device to filter out the noise and retrieve the message of the intra-system communication.

In one embodiment of the system, the receiving device may be an Automated Teller Machine (ATM). The sending devices may be personal IoT devices. Examples of personal IoT devices may include smart phones, laptops, tablets, and fitness trackers. Personal IoT devices may also include smart apparel and smart accessories, an example of which may be smart glasses. The intra-system communication may include the sending of authentication information from the IoT devices to the ATM.

In another embodiment, the system may include a dedicated masking device. The masking device may function exclusively to emit masking signals into the environment of the system. The masking device may be the only device in the system designated to emit masking signals.

In another embodiment, the SC component may be contained solely in one administrative device. The device may have administrative functionality, and include a degree of control over other IoT devices in the system. The SC component of the administrative device may direct the transmission of messages and the emission of masking signals in the system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative system architecture 100. Architecture 100 may represent a system of wireless communication between two IoT devices. IoT device 102 may be a base node. IoT device 104 may be a field IoT device. The field device 104 may be transmitting a sensitive message, 106. The sensitive message may include packets. The base node 102 may emit an electromagnetic masking signal 108. The transmissions and emissions may be under the direction of a secure-hop (SH) component. The masking signal may be substantially simultaneous to the transmission of the sensitive message. The masking signal may introduce noise into the environment of the transmission. The noise may protect the sensitive message from interception.

Figure 2:
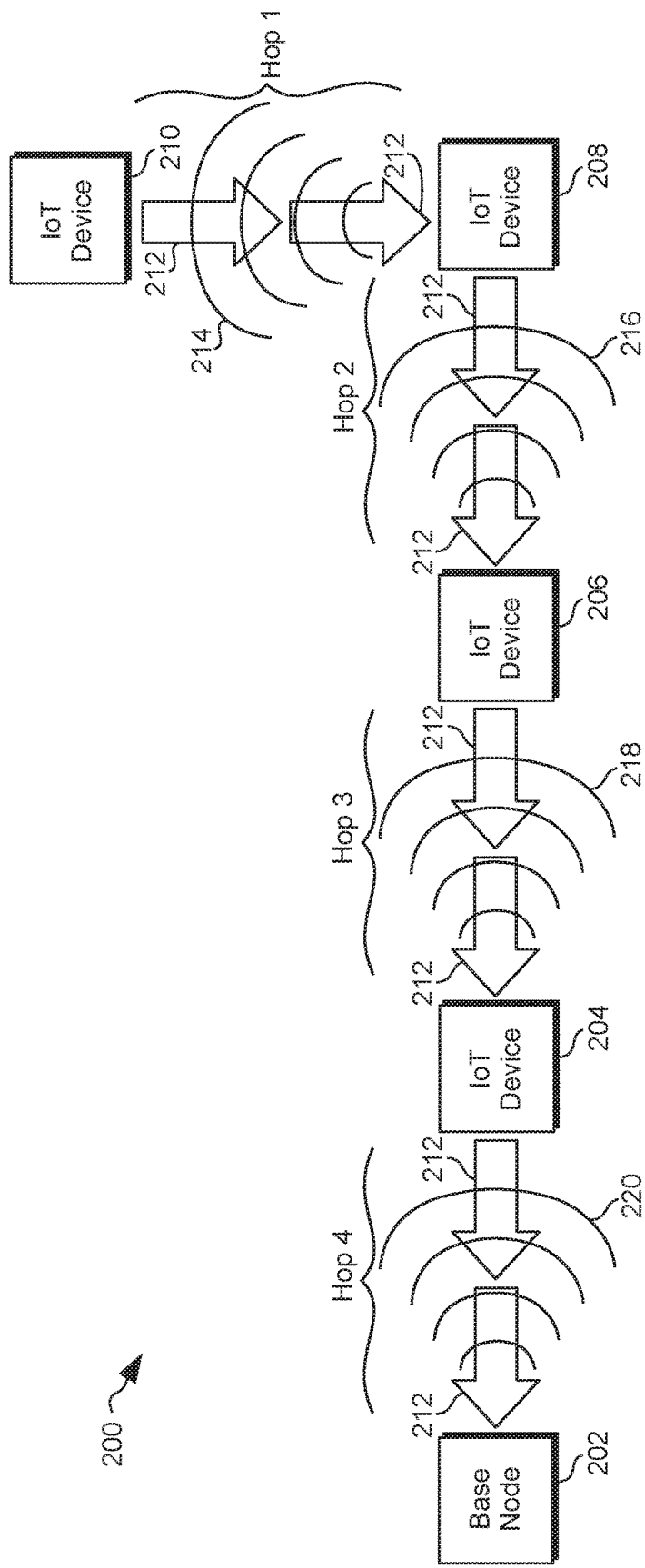
FIG. 2 shows another illustrative system in accordance with principles of the disclosure.

FIG. 2 shows illustrative system architecture 200. Architecture 200 may represent a chain of IoT devices coupling a base node 202 to a field IoT device 210. The field IoT device may transit a sensitive message that may reach the base node. The transmission of the sensitive message may be directed by the SH component of each IoT device in the chain. The message may travel in multiple communication hops, numbered 1-4 in the diagram, as follows. In hop 1, the field IoT device 210 may transmit sensitive message 212 to IoT device 208. Substantially simultaneously to the transmission of message 212, device 208 may emit masking signal 214. In hop 2, the IoT device 208 may relay sensitive message 212 by transmitting it to IoT device 206. Substantially simultaneously to the transmission of message 212, device 206 may emit masking signal 216. In hop 3, the IoT device 206 may further relay sensitive message 212 by transmitting it to IoT device 204. Substantially simultaneously to the transmission of message 212, device 204 may emit masking signal 218. In hop 4, the IoT device 204 may further relay sensitive message 212 by transmitting it to the base node 202. Substantially simultaneously to the transmission of message 212, base node 202 may emit masking signal 220. Thus, the sensitive message traversed the entire span of the chain of IoT devices. Furthermore, the sensitive message was protected from interception at each hop by the emission of a masking signal.

The particular system architecture 200 depicts 5 IoT devices and 4 hops. However, one of ordinary skill in the art will appreciate that the system may contain fewer devices, or many more as well. Furthermore, the chain may take the form of a straight line. The chain may also be curved, or doubled back on itself, or any other shape that the devices may form when they are arrayed in the chain. The shape of the chain may change with the movement of the devices. Additionally, the number of hops required may depend on the shape of the chain. In a linear chain, when each device is within the range of just one other device on either of its two opposing sides, the number of hops may be N−1, where N represents the total number of devices. However, if the IoT devices are in a clustered or curved formation, paths may exist for the message that involve less than N−1 hops. These paths may circumvent some devices entirely. Additionally, if some IoT devices are within the wireless range of less than 2 other devices, they may be ineffective to relay a message. As such, those devices may not be included in the chain of devices in the system.

Figure 3:
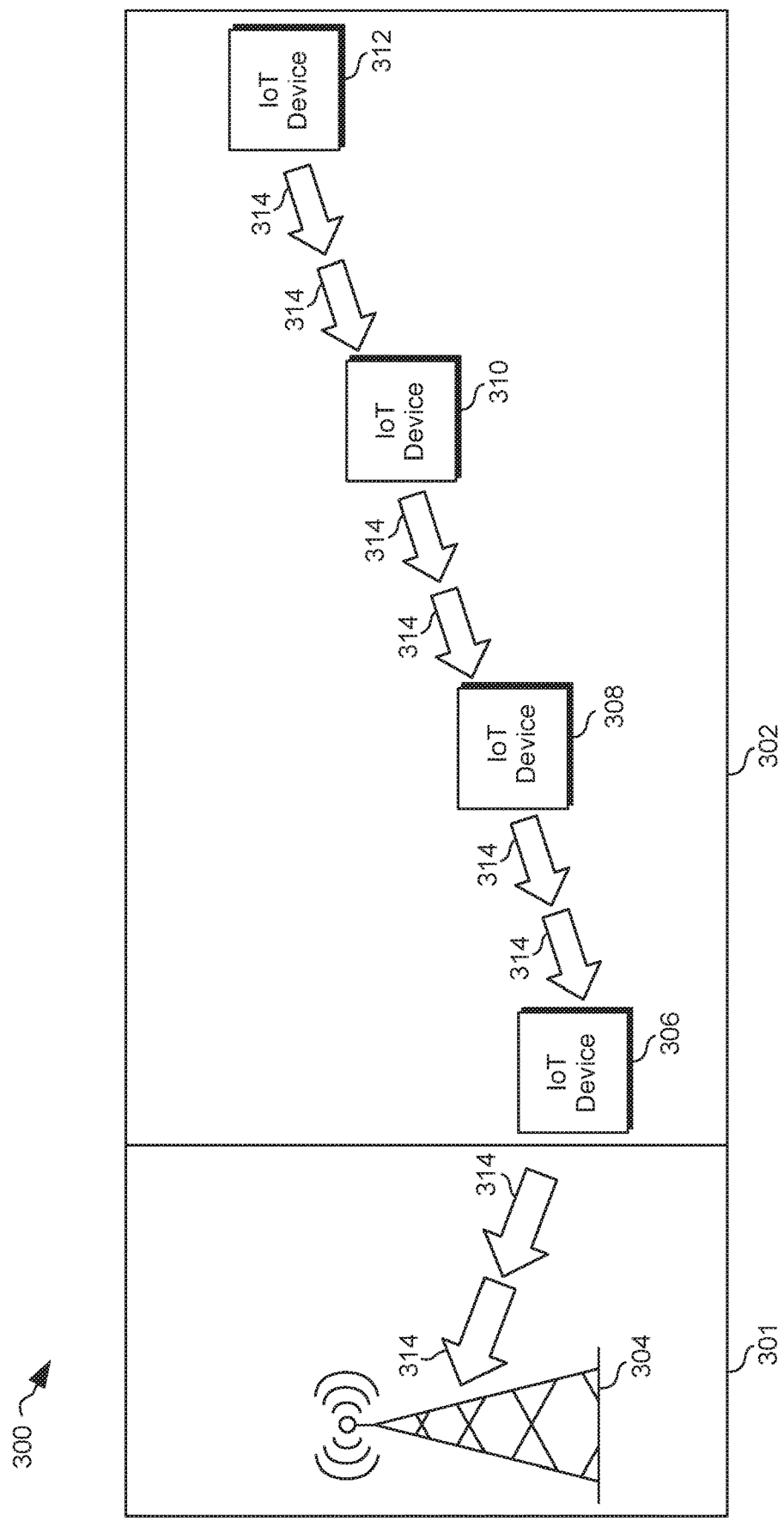
FIG. 3 shows another illustrative system in accordance with principles of the disclosure.

FIG. 3 shows illustrative system architecture 300. The layout of architecture 300 may represent a geographical zone. The geographical zone may be divided into two contiguous sub-zones, 301 and 302. Zone 301 may represent a first area with wireless communication functionality. The wireless communication functionality may be assisted by a wireless node, 304. Node 304 may be coupled to a communication network. Node 304 may be a cellular tower. Zone 302 may represent a second area that lacks wireless communication functionality. For example, zone 302 may be a disaster zone in which wireless infrastructure was destroyed. For example, a cell tower in zone 302 may have been knocked over.

Architecture 300 may include a plurality of IoT devices. Each IoT device may include an emergency-communication component. A first IoT device, 306, may be situated in zone 301, such that it is able to communicate wirelessly with the wireless node 304 in zone 301. Other IoT devices, 308, 310, and 312, may be in zone 302, and unable to communicate with wireless node 304. IoT devices 308, 310, and 312, may be classified as isolated IoT devices. The first IoT device, 306, may be within wireless range of device 308. The IoT devices may form a chain of wirelessly connected devices. Device 308 may be within wireless range of device 310, and device 310 may be within wireless range of device 312. The isolated IoT device geographically farthest from the wireless node 304, device 312, may transmit a message 314. The emergency-communication component of device 310 may direct its device to receive the message 314 and relay it, by transmitting the message 314 to device 308. The emergency-communication component of device 308 may direct its device to receive the message and relay it, by transmitting the message 314 to first device 306. The emergency-communication component of first device 306 may direct its device to receive the message and relay it, by transmitting the message 314 to the wireless node 304. Thus, the message 314 traversed the chain from the farthest isolated IoT device 312, all the way to the wireless node 304 and the communication network coupled thereto. The system utilized multiple hops to achieve this traversal, numbered 1-4 in the diagram. However, one of ordinary skill in the art will appreciate that the system may be contain any number of devices and hops.

Figure 4:
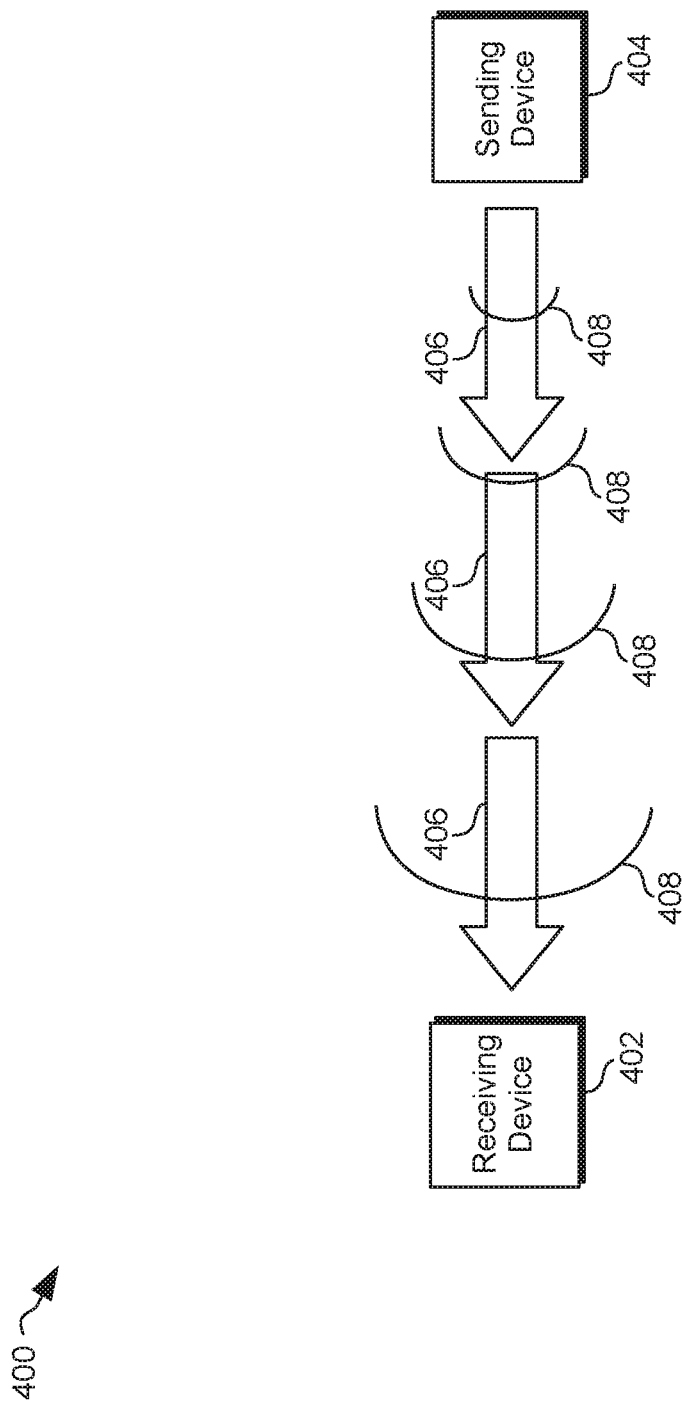
FIG. 4 shows another illustrative system in accordance with principles of the disclosure.

FIG. 4 shows illustrative system architecture 400. Architecture 400 may represent a system of protected wireless communication between two IoT devices. The devices may each include a secure-communication (SC) component. The devices may be communicating a message in an intra-system communication. A sending device 404 may be sending a message, 406, to receiving device 402. The SC component of device 404 may direct its device 404 to emit an electromagnetic masking signal 408 in synchrony with the transmission of message 406. The masking signal may protect the message 406 from being intercepted.

The emission of two signals, 406 and 408, substantially simultaneously by the same device, 404, may use separate units of hardware for each. For example, device 404 may contain two antennas, one for transmitting messages and one for emitting masking signals. Alternatively, a single signal that represents the sum of the two signals, 406 and 408, may be transmitted by a single unit of hardware, such as one antenna.

Figure 5:
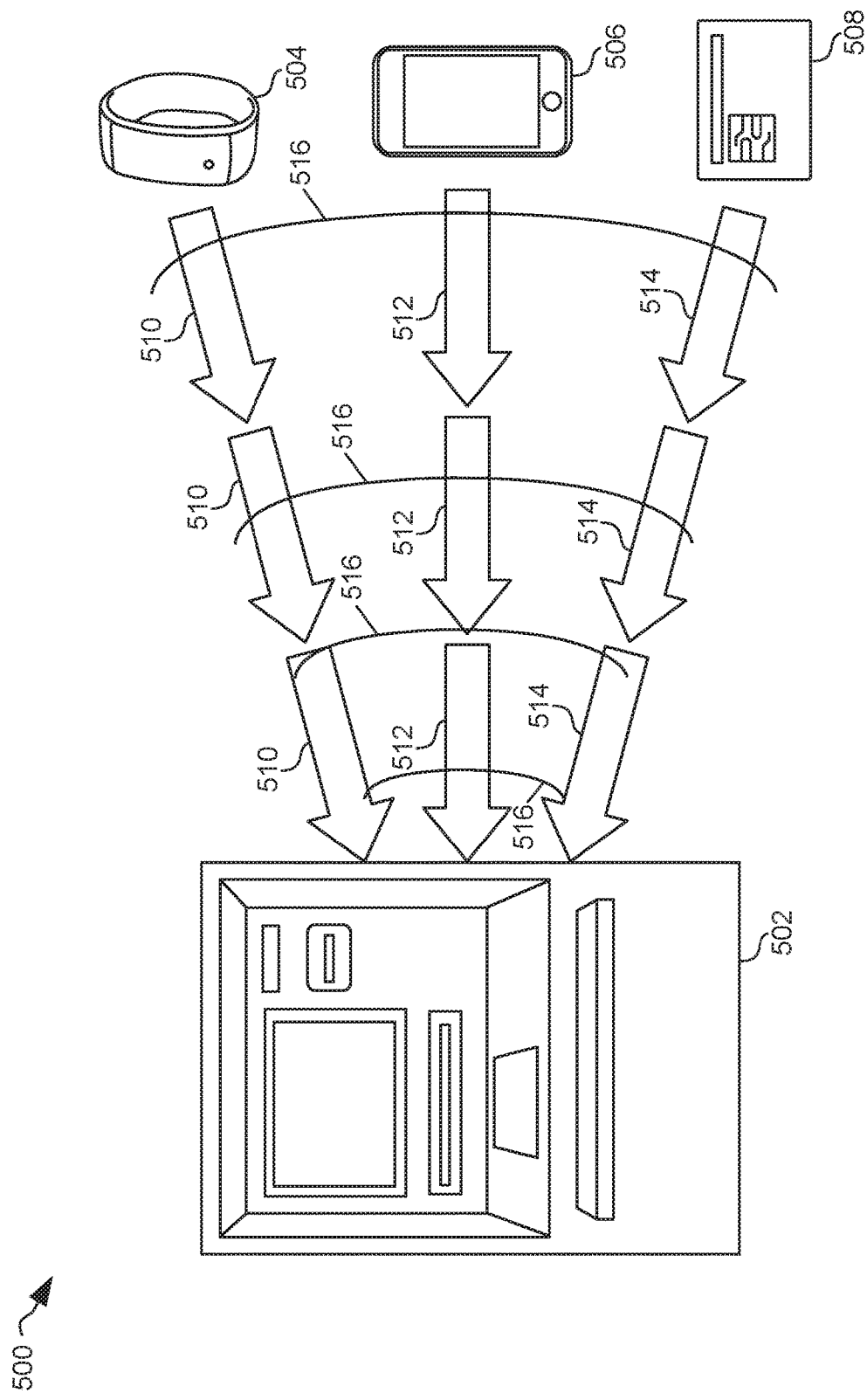
FIG. 5 shows another illustrative system in accordance with principles of the disclosure.

FIG. 5 shows illustrative system architecture 500. Architecture 500 may represent a system with a plurality of constituent IoT devices. The devices may be transmitting protected intra-system communications between each other. For example, IoT devices 504, 506, and 508 may be IoT devices that are each sending messages to a receiving device 502. Device 502 may be an Automated Teller Machine (ATM) that requires multiple points of authentication of a user. The user may have about his person a plurality of personal IoT devices. The personal IoT devices may include a smart-watch 504, a smartphone 506, and a smart-card 508. Each personal IoT device may send an authentication message to the ATM. In the diagram, device 504 sends authentication message 510, device 506 sends authentication message 512, and device 508 sends authentication message 514. The ATM 502 may emit masking signal 516 substantially simultaneous to the transmission of the authentication messages. The masking signal may protect the authentication message from being intercepted.

In architecture 500, the personal IoT devices 504, 506, and 508 may transmit their authentication messages asynchronously. In the asynchronous scenario, the ATM 502 may emit multiple masking signals, one masking signal substantially simultaneous with each authentication message transmission. In another scenario, the personal IoT devices may transmit their authentication messages synchronously. In the synchronous scenario, one masking signal may suffice to protect all of the authentication messages at once.

Figure 6:
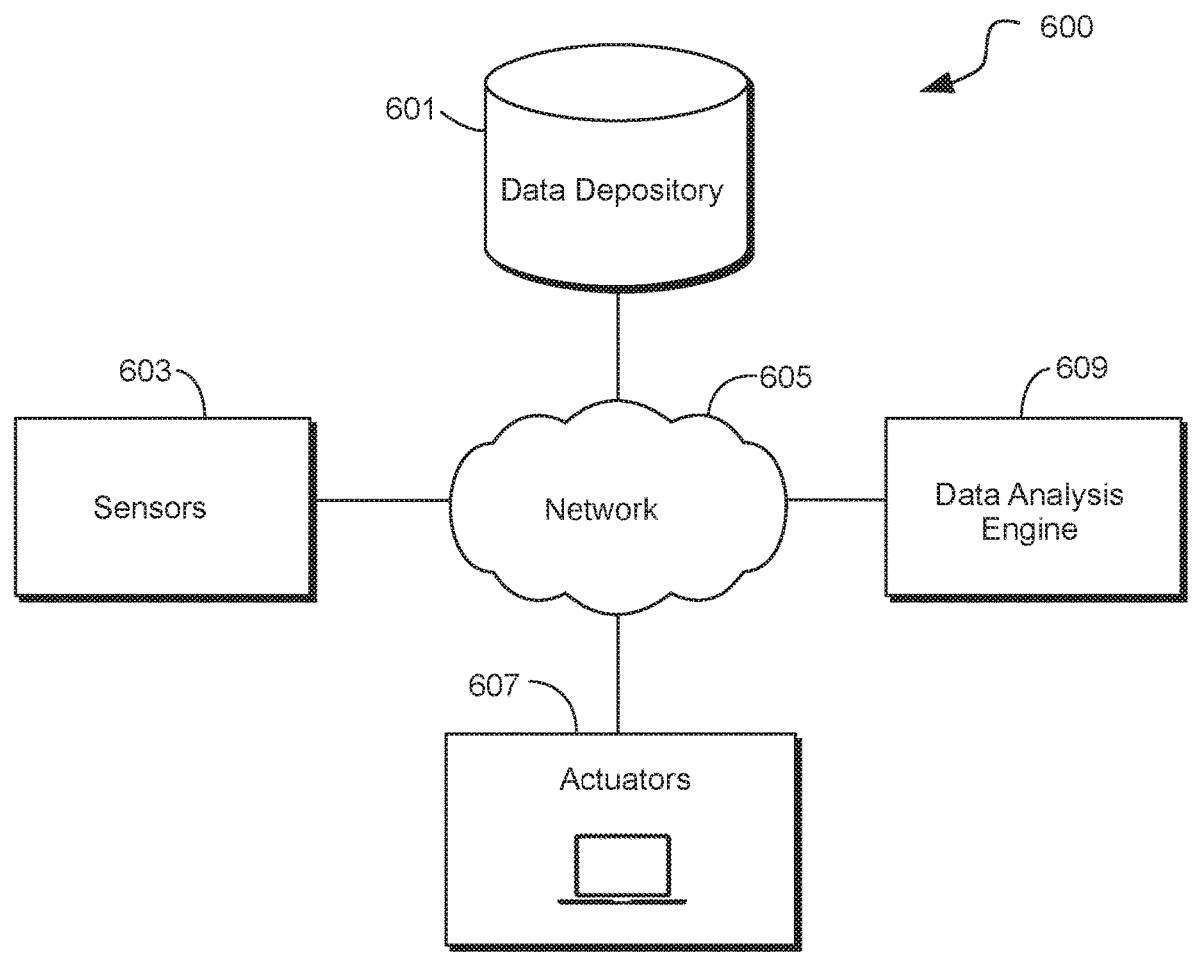
FIG. 6 shows another illustrative system in accordance with principles of the disclosure.

FIG. 6 shows illustrative system architecture 600. Architecture 600 may represent an internet of things ("IoT"). A differentiator between IoT and conventional networks is a traffic profile. In an IoT, nodes may not have defined or known network positions, communication protocols or security services.

Architecture 600 may include nodes. Each node may include two or more nodes. FIG. 6 shows exemplary nodes 601, 603, 605, 607 and 609. The architecture includes sensors 603. Sensors 603 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Sensors may implement two or more functions. For example, sensors may measure changes in their native environment, capture data related to the measured changes store and communicate the captured data. Sensors may be accessed by other sensors or any other node. Sensors may transmit captured data to another node. Sensors may broadcast captured data to two or more nodes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 601.

Sensors may be positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 609 may create and/or be included in such groups. In some embodiments, the captured data may be organized by data repository 601.

Based on data captured from sensors 603, actuators 607 may respond to a detected event. Based on the capture and analysis of multiple sources of data, actuators 607 may be instructed to take action without human intervention.

Generally, sensors and other nodes that form part of architecture 600 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 6, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing").

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 603 may utilize different communication protocols to transmit captured data or communicate with other nodes. Despite such operational differences, sensors 603 may operate substantially seamlessly together. Interoperability may allow captured data to be substantially seamlessly captured and interpreted by data analysis engine 609. Based on interpreting the captured data, data analysis engine 609 may issue instructions to actuators 607.

Interoperability may be implemented across any suitable nodes of architecture 600. Interoperability may enable communication between sensors 603 and other nodes. Interoperability may enable architecture 600 to provide services and applications via actuators 607. Interoperability may allow services and content to be provided anywhere, anytime and based on input/output of different nodes.

Data gathering by one or more of sensors 603 may be controlled by one or more other nodes of architecture 600. For example, data analysis engine 609 may control a quantity of data captured by sensors 603. Alternatively, data repository 601 and/or analysis engine 609 may filter or otherwise intelligently process data captured by sensors 603.

Timing of when data is captured by sensors 603 may be controlled by any suitable node on architecture 600. For example, data may be captured in real-time or at predefined intervals such as once a day. Data may also be captured in response to a detected environmental status change.

Data analysis engine 609 may filter data captured by sensors 603. Data analysis engine 603 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 609 may perform pattern recognition to identify correlations and trends in captured data. Data analysis engine 609 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 600 to/from nodes may be routed along multiple communication links until the transmitted information reaches a desired destination node (e.g., data analysis engine 609). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 603 may belong to, or operated by, different administrative/management domains. Sensors 603 may be operated by different domains without expressly-defined relationships among such domains. The absence of express relationships enables access to data captured by sensors 603 by one or more architectures having one or more features in common with architecture 600. Groups of sensors may include sensors from two or more administrative domains.

Data repository 601 may receive data captured by sensors 603. In some embodiments, data captured by sensors 603 may be transmitted directly to data analysis engine 609. Data stored in repository 601 may be sorted and analyzed by data analysis engine 609. Data stored in data repository 601 may be so voluminous and complex (e.g., structured/unstructured and/or constantly changing) that traditional data processing application software may be inadequate to meaningfully process the data (e.g., "big data"). Data analysis engine 609 may include software applications specially designed to process large volumes of data ("big data analytics").

Based on captured data, data analysis engine 609 may optimize processes, reduce loss (e.g., fraud), improve customer understanding and targeting, increase automation, decrease latency in products and/or services provided by actuators 607 and identify new analytical models that may utilize data captured by sensors 603.

Architecture 600 may include one or more layers of software applications. Software applications may implement a variety of functions and provide varied services to nodes of architecture 600. Software applications running on data analysis engine 609 may submit requests to sensors 603 for retrieval of specific data to achieve a functional goal provided by actuators 607. Software applications may control data captured by sensors 603 or actions taken by actuators 607. Software applications may control a flow of information within architecture 600.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 603 and passing captured data to data repository 601 and/or data analysis engine 609.

Software applications may provide security services that mitigate threats to the integrity of data captured by sensors 603 or architecture 600 generally.

Actuators 607 may respond to data transmitted or processed by other nodes such as data analysis engine 609. Actuators 607 may include devices that modify the physical state of a physical entity. Actuators 607 may include devices that modify a virtual state of information. For example, actuators 607 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 607 may verify identities, trigger electronic payments, extend credit or debit accounts.

Within an intelligent networked system such as architecture 600, sensors 603 perform the functions of input devices—they serve as, for example, "eyes," collecting information about their environment. In contrast, actuators 607 act as "hands," implementing decisions based on data captured by sensors 603. A single node may include the functions of sensors and actuators.

Actuators 607 may communicate with data analysis engine 609 and sensors 603. Actuators 607 may include an application programming interface ("API") for communicating with other nodes. Actuators 607 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision and communication processes for actuators 607.

In the absence of express relationships between sensors and the devices that access data captured by the sensors traditional approaches for managing trust, security naming, discovery, or other traditional network services may not be applicable or available.

Generally, nodes of architecture 600 may interact and cooperate using one or more interaction paradigms. Exemplary interaction paradigms include client-server and peer-to-peer interactions. Illustrative communication protocols may include HyperText Transfer Protocol ("HTTP"), Simple Object Access Protocol ("SOAP"), REpresentational State Transfer ("REST") Constrained Application Protocol ("CoAP") or SensorML.

As a result of the disparate nature of sensors 603, an architecture, such as architecture 600 incorporating sensors 603, may support a variety of communication protocols. Illustrative supported protocols may include IEEE 802.15.4 ("ZigBee"), IEEE 802.11, Bluetooth Low Energy (BLE), 3G and 4G and LTE. For example, ZigBee requires approximately 20 to 60 mW (for 1 mW transmission power, a range of 10 to 100 meters and a data transmission rate of 250 kbit/s).

To conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically added or removed from an architecture. A security layer or buffer may be modular to scale quickly and meet growth/contraction requirements.

A physical layer may physically link nodes of architecture 600. The function of this physical layer is to provide communication pathways to carry and exchange data and network information between multiple sub-networks and nodes.

Figure 7:
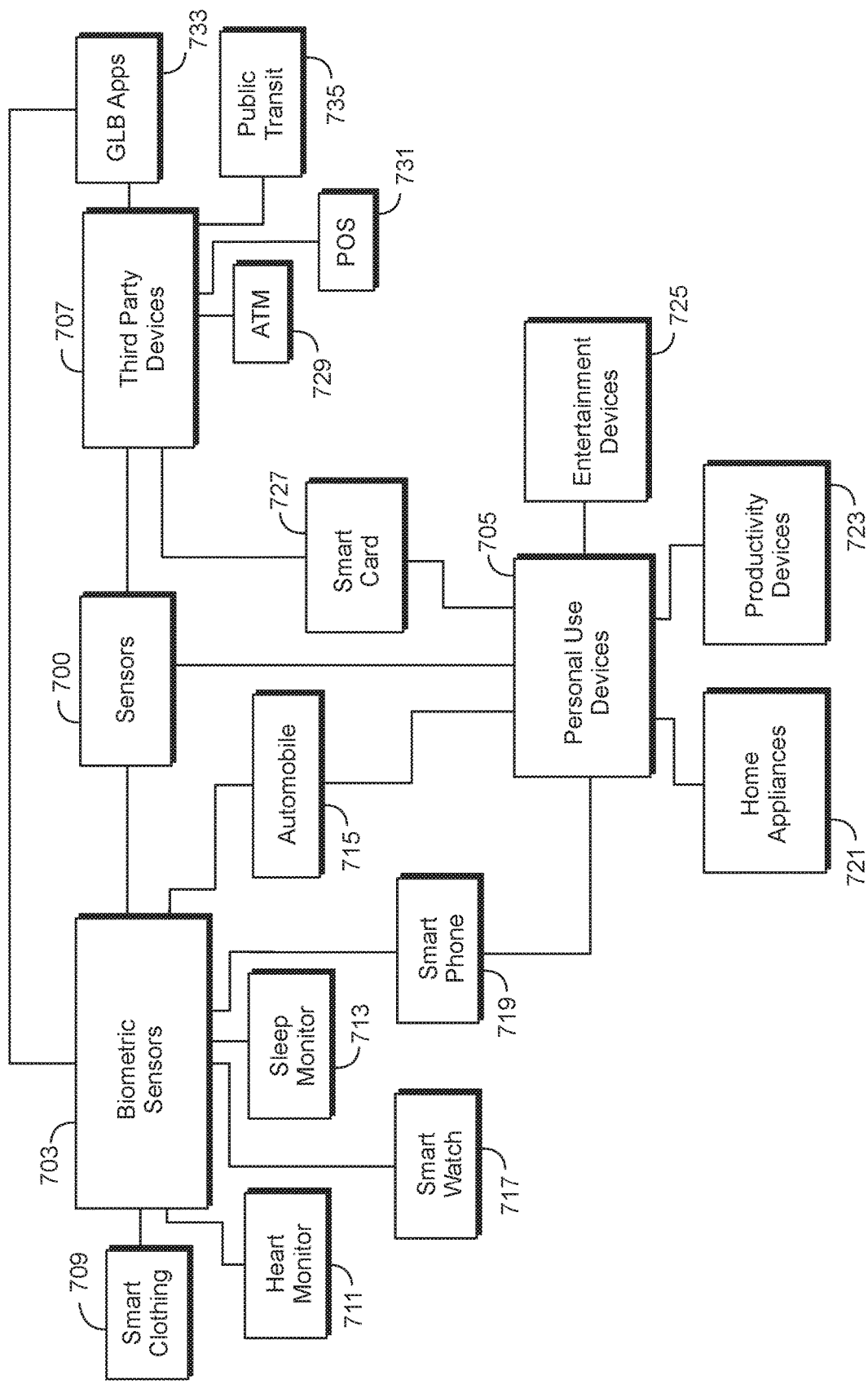
FIG. 7 shows another illustrative system in accordance with principles of the disclosure.

FIG. 7 shows illustrative sensors 700. Sensors 700 may include or more features of sensors 603 (shown in FIG. 6). Sensors 700 include biometric sensors 703 that sense biometric attributes. For example, biometric sensors may be embedded in "smart" clothing 709 that monitors a wearer's physical condition. Such clothing may capture biometric data, such as pulse rate, temperature, muscle contraction, heart rhythm and physical movement. Smart clothing may be linked to smart phone 719 such as via a Bluetooth® communication link. Smart phone 719 may transmit data captured by smart clothing 709 to one or more other network nodes.

Biometric sensors 703 may include other illustrative sensors such as heart monitor 711, sleep monitor 713, smart watch 719, smart phone 719 and automobile 715.

Sensors 700 may include personal use devices 705. Personal use devices 705 may include sensors embedded in home appliances 721, productivity devices 723 or entertainment devices 725. Productivity devices 723 may include tablets, laptops or other personal computing devices. Entertainment devices may include gaming consoles and the like.

Sensors 700 also include third-party devices 707. Third-party devices may include devices that are not under the direct or exclusive control of a user. A user may interact with third-party devices 707 to obtain a desired service provided by the third-party.

Exemplary third-party devices include smart card 727. Smart card 727 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices. Such purchasing instruments may sense a location or frequency of use.

Such purchasing instruments may include "EMV" chips. EMV is a technology that derives its name from the companies (Europay, MasterCard, and Visa) that helped develop the technology. When the credit card and its associated EMV chip are inserted into a specialized card reader (another sensor), the reader powers the EMV chip and the EMV chip generates a new authorization code each time the credit card is used. The EMV chip may capture transaction data such as amounts, location or identity of the chip reader.

Third-party sensors 707 may include ATMs 729 and point-of-sale terminals ("POS") 731. Such devices may also be actuators.

Third-party devices may also include software applications 733. Applications 733 may be used to access services, such as an online banking portal. Such applications may detect biometric features to authorize access to the online banking portal. Third-party devices may include sensors that capture data associated with power consumption (e.g., smart grids), electronic communication traffic, logistics (package movement) or any other suitable environmental condition.

FIG. 7 shows that sensors may categorically overlap. For example, an application used to access an online bank portal may capture a biometric feature (e.g., fingerprint) to authenticate a user.

Each of the sensors shown in FIG. 7 may include different and possibly incompatible hardware. For example, sensors may each have different operating systems (or none at all), processor types and memory. Sensors 700 may be inexpensive, single-function devices with rudimentary network connectivity. Sensors 700 may be positioned in remote and/or inaccessible locations where human intervention or configuration is difficult.

To conserve power, sensors 700 may utilize 16-bit microcontrollers. Such microcontrollers may use less than 400 μW per MIPS ("million instructions per second") and may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication standards.

Furthermore, because of potentially disparate features and characteristics of sensors 700, security solutions may be used to verify an authenticity of data transmitted by sensors having disparate hardware and software capabilities.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for protected extensible communication with IoT devices are provided. Persons skilled in the art will appreciate that the present invention can be practiced by other than the described embodiments, which are presented for purposes of illustration rather than of limitation, and that the present invention is limited only by the claims that follow.

What is claimed is:

1. An extensible, multi-hop, Internet-of-Things (IoT) device-assisted, protected wireless communication system, said system for establishing a secure channel of wireless communication to a field IoT device, said system comprising:
   a plurality of constituent IoT devices, each of said plurality of IoT devices including the ability to communicate wirelessly with other IoT devices, wherein:
      at least one of the plurality of IoT devices is configured to act as a base node;
      and at least one of the plurality of IoT devices is the field IoT device, said field IoT device having a sensitive message to communicate with the base node, said message considered sensitive when the message has been determined by the system as requiring to be shielded from outside interception;

each of the plurality of IoT devices comprising a hardware and/or software based secure-hop (SH) component, said SH component:

capable of receiving messages from other constituent IoT devices;

further capable of broadcasting messages to other constituent IoT devices within wireless communication range, each broadcast between constituent IoT devices comprising a communication hop, each communication hop involving a sending device that is sending a message, and at least one receiving device that is receiving the message;

said SH component further capable of emitting a masking signal substantially simultaneous to each communication hop, said masking signal comprising electromagnetic waves of a particular pattern of constant or varying frequency, wavelength, and amplitude, said pattern introducing electromagnetic noise into an environment of the communication hop, said noise rendering the message being transmitted across the communication hop unintelligible to an entity outside the system, said outside entity that is attempting to illicitly obtain data, absent proper consent, by intercepting messages being transmitted across communication hops;

said SH component further comprising the capability, in a receiving device in a communication hop, to recognize and decipher said particular pattern of a masking signal, such that the receiving device is able to filter the masking signal out of the noisy environment, and retrieve the intended message transmitted across the communication hop;

said system comprising the plurality of constituent IoT devices arrayed in a chain-like fashion, said chain coupling the base node and the field IoT device, such that each constituent IoT device is within wireless communication range of at least one other constituent IoT device, said system extensible to couple at least one additional IoT device to the chain to further extend the chain; and the field IoT device is configured to send the sensitive message to the base node in a manner that is protected from being intercepted, said sensitive message hopping, under the direction of the SH component of each constituent IoT device, from one constituent IoT device in the chain to the next, each hop protected with the emission of a masking signal.

2. The system of claim 1, wherein the receiving device emits the masking signal, and the system further comprises an alert signal which the sending device broadcasts prior to initiating a communication hop to be masked, said alert signal directing the receiving device to emit a masking signal.

3. The system of claim 1, wherein the sending device emits the masking signal, and wherein the receiving device is capable of recognizing and deciphering the particular pattern of the masking signal, said capability based on the system devices being preprogrammed with predetermined patterns or sets of patterns.

4. A method of establishing an extensible, multi-hop, protected channel of wireless communication between a base node and a field IoT device, within a system of a plurality of constituent IoT devices, said method comprising:

configuring, in each of the plurality of constituent IoT devices, a hardware and/or software based secure-hop (SH) component, said SH component capable of receiving messages from other constituent IoT devices, said SH component further capable of broadcasting messages to other constituent IoT devices within wireless communication range, each broadcast between constituent IoT devices comprising a communication hop, each communication hop involving a sending device that is sending a message, and at least one receiving device that is receiving the message, said SH component configured to emit a masking signal substantially simultaneous to each communication hop, said masking signal comprising electromagnetic waves of a particular pattern of constant or varying frequency, wavelength, and amplitude, said pattern introducing electromagnetic noise into an environment of the communication hop, said noise rendering the message being transmitted across the communication hop unintelligible to an entity outside the system, and said SH component further configured to enable the receiving device to recognize and decipher said particular pattern of the masking signal, such that the receiving device is able to filter the masking signal out of the noisy environment, and retrieve the message transmitted across the communication hop;

arraying, a plurality of constituent IoT devices in a chain-like fashion between the base node and a field IoT device, such that each constituent IoT device is within wireless communication range of at least one other constituent IoT device, said array extensible for coupling at least one additional IoT device to extend the chain to the additional IoT device;

generating, by at least one field IoT device, a secure message to communicate with the base node, said message considered secure when the message has been determined by the device as requiring to be shielded from outside interception; and sending, by the field IoT device, the secure message to the base node via the chain of IoT devices, in a manner that is protected from being intercepted, said secure message hopping from one constituent IoT device in the chain to the next using the SH component, the SH component further protecting each hop of the secure message from interception by emitting a masking signal.

5. An extensible, multi-hop, Internet-of-Things (IoT) device-assisted, emergency wireless communication system, said system for establishing wireless communication to an isolated device situated in an area wherein wireless communication capability is heretofore lacking, said system comprising:

a plurality of IoT devices, each of said plurality of IoT devices including the ability to communicate wirelessly with other IoT devices;

a first geographical area comprising wireless communication capability, said first area comprising at least one wireless-enabled node capable of communicating wirelessly within the first area, said node coupled to a communication network;

a second geographical area lacking functional wireless communication capability, such that IoT devices in the second area are beyond the range of the wireless-enabled node of the first area, and are unable to communicate wirelessly with the communication network;

wherein the first area is contiguous with the second area;

the system further comprising at least one isolated IoT device, included in the plurality of IoT devices, said isolated IoT device situated in the second area, and unable to send any messages to the communication network;

the system further comprising at least a first IoT device, included in the plurality of IoT devices, said first IoT device further comprising the ability to communicate wirelessly with the wireless-capable node in said first area;

wherein said first IoT device is situated:
  in said first area,
    and relatively proximal to the border of said first area with said second area,
    such that the first IoT device is able to communicate wirelessly with the wireless-capable node in the first area, and the first IoT device is also able to communicate wirelessly with at least one other isolated IoT device in the heretofore wireless communication-lacking second area;

the system further comprising an emergency-communication component built in to each IoT device, said component comprising software and/or hardware, and said component controls its host IoT device and directs the flow of communications in the IoT device;

wherein the emergency-communication component of an isolated IoT device directs the isolated IoT device to send a wireless message to the first IoT device, and the emergency-communication component of the first IoT device relays the message by directing the first IoT device to receive the message and subsequently broadcast it the wireless-enabled node that is coupled to the communication network, said message effectively hopping from the isolated IoT device to the first IoT device, and hopping once again from the first IoT device to the wireless-enabled node; and wherein said system is extensible by deploying at least one additional IoT device in the second area, each additional IoT device within the wireless communication range of at least one other IoT device, each additional IoT device, under the direction of each device's emergency-communication component, functioning as a router to further extend, distal from the first area, the range of wireless communication with the wireless-enabled node, each device relaying communication from one to the other in a chain fashion, until the isolated IoT device farthest from the first area is reached, at which point said farthest isolated IoT device is enabled to communicate with said communication network in the first area via the chain of IoT devices, under the direction of each device's emergency-communication component, and the farthest isolated IoT device sends a wireless message to the communication network.

6. The system of claim 5, wherein the emergency-communication component of an IoT device is activated in a specific scenario by an entity with administrative privileges over the IoT device, said scenario wherein wireless communication in said second area has been compromised.

7. The system of claim 5, further comprising a system-recognized emergency message, said emergency message broadcasted by an isolated IoT device in need of assistance, the emergency message flagged to alert other devices of its special status, and wherein the emergency-communication component is configured to exclusively relay emergency messages to and from other IoT devices in the system.

8. The system of claim 5, wherein the emergency-communication component further comprises a routing protocol in which the emergency-communication component relays wireless communications, received from other isolated IoT devices, to all other IoT devices within its wireless communication range.

9. The system of claim 5, wherein the emergency-communication component further comprises a routing protocol in which the emergency-communication component relays wireless communications, received from other isolated IoT devices, exclusively to other IoT devices that are situated geographically closer to the wireless-enabled node in the first area.

10. The system of claim 5, wherein the wireless-enabled node in the first area comprises a cellular tower.

11. The system of claim 5, wherein the wireless-enabled node in the first area comprises a wireless internet router.

12. The system of claim 5, wherein the mode of wireless communication between IoT devices comprises a short-distance, low-power protocol, to conserve the energy of the system.

13. The system of claim 5, wherein at least one of the IoT devices comprises a rescue device, said rescue device either:
  attached to a living rescue worker, said worker either a person or an animal;
  or said rescue device comprising a remotely or autonomously operating airborne drone or ground robot;

and wherein at least one isolated IoT device comprises a personal IoT device located in the proximity of a person in distress, and the person in distress sends an emergency message from the personal IoT device to the communication network, said emergency message reaching the communication network via the chain of IoT devices in the system, under the direction of each device's emergency-communication component.

14. A system comprising constituent IoT devices, that establishes a secure channel of communication between its constituent IoT devices, said system comprising:
  a plurality of constituent IoT devices, each of said plurality of constituent IoT devices comprising the ability to communicate wirelessly with other IoT devices within the system in an intra-system communication, said intra-system communication comprising a sending device that is transmitting a message and a receiving device which is the target recipient of said message;
  each IoT device comprising a secure-communication (SC) component, said SC component comprising hardware and/or software, wherein said SC component emits a masking signal substantially simultaneous to an intra-system communication;
  said masking signal comprising electromagnetic waves of a particular pattern of constant or varying frequency, wavelength, and amplitude, said pattern introducing electromagnetic noise into a system environment, said noise rendering a substantially simultaneous intra-system communication between constituent IoT devices unintelligible to an entity outside the system, said outside entity that is attempting to illicitly obtain data by intercepting intra-system communications absent proper consent; and
  said SC component further comprises the capability, in the receiving device in an intra-system communication, to recognize and decipher said particular pattern of a masking signal, such that the receiving device is able to filter the masking signal out of the noisy environment, and retrieve the intended message of the intra-system communication.

15. The system of claim 14, further comprising an SC component that is active at all times, wherein every intra-system communication is secured with a masking signal.

16. The system of claim 14, further comprising an SC component that is only active in response to an alert signal, wherein a constituent IoT device alerts the system of an imminent intra-system communication that will comprise secure information, said information considered secure when the information has been determined by the system as requiring to be shielded from outside interception, said alert comprising the broadcasting of a predetermined activation signal, and said alert activates the SC component to emit a masking signal to secure the sensitive intra-system communication.

17. The system of claim 14, wherein the receiving device emits the masking signal, and further comprising an alert signal which the sending device broadcasts immediately before sending an intra-system communication to be masked, said alert signal directing the receiving device to emit a masking signal.

18. The system of claim 14, wherein the sending device emits the masking signal, and wherein the receiving device is capable of recognizing and deciphering the particular pattern of the masking signal, said capability based on the system devices being preprogrammed with predetermined patterns or sets of patterns.

19. The system of claim 14, wherein the sending device emits the masking signal, and wherein the receiving device is capable of recognizing and deciphering the particular pattern of the masking signal, said capability based on an encrypted message, sent from the sending device to the receiving device, that indicates the particular pattern of the masking signal.

20. The system of claim 14, wherein the receiving device comprises an Automated Teller Machine (ATM), and the sending devices are personal IoT devices, and the intra-system communication comprises the sending of authentication information from the IoT devices to the ATM.

* * * * *